Figure 1:
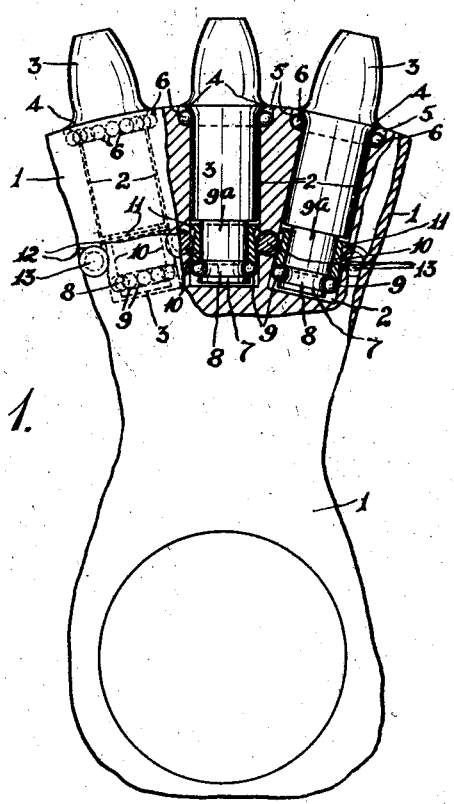

April 6, 1926.

J. LAX

WORM WHEEL

Filed May 17, 1923

1,580,055

Witness:
Arthur Thompson

Inventor:
James Lax

Patented Apr. 6, 1926.

1,580,055

UNITED STATES PATENT OFFICE.

JAMES LAX, OF JOHANNESBURG, TRANSVAAL, SOUTH AFRICA, ASSIGNOR OF ONE-HALF TO JAMES HENRY STUTHRIDGE, OF JOHANNESBURG, SOUTH AFRICA.

WORM WHEEL.

Application filed May 17, 1923. Serial No. 639,596.

*To all whom it may concern:*

Be it known that I, JAMES LAX, a subject of the King of Great Britain, and resident of Johannesburg, Transvaal Province, Union of South Africa, have invented certain new and useful Improvements in Worm Wheels, of which the following is a specification.

This invention appertains to worm-wheels, or to wheels which are employed with worms or the like for the transmission of motion or power.

The invention has for its object to construct a worm-wheel in such a way as to minimize the friction engendered between the worm and worm-wheel, or so as to obtain a practically frictionless transmission of the power or motion from the worm to the worm-wheel and to allow of any looseness in the working parts being taken up.

To the attainment of this object the invention consists, broadly, in constructing or providing a worm-wheel with teeth or their equivalent which are adapted to rotate independently of each other about their own axes when in engagement with the worm and in providing means whereby any looseness or play in the bearings of the teeth can be taken up.

The invention will be described in detail in connection with the accompanying drawings, wherein a practical embodiment of the invention is illustrated.

In the drawings,

Fig. 1 is a side part-sectional elevation of portion of a worm-wheel constructed according to one form of the invention.

In constructing the improved worm-wheel in the form illustrated, a centre piece 1, in the form of a disc, as shown, is employed, or it may be a rim connected by spokes to a hub or centre piece. Around the periphery of the disc 1 there is formed a number of radial holes or recesses 2, the distance said holes 2 are apart circumferentially of of the disc 1 being determined by the pitch of the thread of the worm (not shown) with which it is to engage.

In each radial hole or recess 2 there is arranged a rotatable pin 3 which projects therefrom and the outwardly projecting part of which forms the tooth. The tooth portion is made of circular cross-section, and is curved from near the periphery of the disc 1, or root or base of the tooth, to the preferably flattened outer end thereof.

The root of the tooth is enlarged or shaped to form an annular projection 4, and the outer end of the hole 2 is recessed or enlarged, as indicated at 5, to form a race for balls 6 arranged between said annular projection 4 and the bottom of the recess 5.

The inner portion of the pin 3 is rotatable in the hole 2, and the inner end 7 of the pin 3, near the bottom of the hole 2, is formed with an annular groove 8 to provide a race for a ring of balls 9 placed between said inner end 7 and the wall of the hole 2 near the inner end thereof. A part of the inner portion of the pin 3 is reduced in diameter, as indicated at 9ª, and around said reduced portion there is arranged a tapered sleeve or member 10 having its taper in the direction of the outer end of the pin or tooth 3. The outer end of the tapered sleeve 10 is formed with a flange 11 which fits the hole 2 and the inner end of said sleeve 10 is shaped so as to project around the balls 9 which are arranged in the annular groove 8.

Between the inner ends of adjacent pins 3, holes 12 are formed through the disc or rim 1, and in each of said holes 12 a tapered pin 13 is placed and secured, which pin 13 engages with the tapered sleeves 10 of adjacent pins 3 and operates to keep them in engagement with the balls 9 in the grooves 8 near the bottoms of the radial holes 2, by forcing said sleeve members 10 inwards, thus retaining the pins 3 in their respective adjacent holes 2. The tapered pins 13 and the tapered sleeves 10 provide an easily operated means for obtaining nice adjustment of the pins 3 to allow of free rotation thereof and to take up any looseness or play in the ball bearings 6 and 9, at the inner ends of the pins 3 and bases of the teeth, respectively.

Worm-wheels according to the invention may be adapted to work with single or multiple threaded worms.

As the friction between the worm and worm-wheel is minimized, the worms can be made of brass or like metal which can be cut or shaped more quickly than steel, of which worms are at present most commonly constructed.

As the teeth or pins of a worm-wheel constructed according to the invention are preferably all turned, the use of hobs, as at present used to cut the teeth of worm-wheels, is obviated.

With the improved worm-wheel the efficiency of the transmission is not impaired should the worm shaft not be exactly at right angles to the wheel shaft, as the contact between the worm and worm-wheel is only along a line.

The necessity for special means of lubrication, such as an oil bath is avoided, and also the necessity to arrange the worm to engage with the underside of the worm-wheel.

The improved worm-wheel is easily manufactured as compared with ordinary worm-wheels, and its manufacture does not call for the use of expensive machine tools.

What I claim as my invention and desire to protect by Letters Patent is:—

1. A worm-wheel or the like, comprising a centre portion, a plurality of rotatable teeth disposed around the periphery of said centre portion, said teeth being in the form of radially disposed pins partially housed in holes formed around the periphery and said teeth being adapted to rotate independently, anti-friction bearings for each tooth positioned intermediate the tooth and its housing in the centre portion, and adjustable means in the form of a locking pin arranged transversely of the pin for retaining the pin in its housing in the centre portion, as set forth.

2. A worm-wheel or the like, comprising a centre portion, a plurality of rotatable teeth disposed around the periphery of said centre portion, said teeth being in the form of radially disposed pins partially housed in holes formed around the periphery and said teeth being adapted to rotate independently, anti-friction bearings for each tooth positioned intermediate the tooth and its housing in the centre portion, and adjustable means for retaining the pins in their housings in the centre portion, said means including a sleeve arranged around each pin and a locking pin arranged transversely of the pin co-operating with said sleeve to adjust the pin, as set forth.

3. A worm-wheel or the like, comprising a centre portion, a plurality of rotatable teeth disposed around the periphery of said centre portion, said teeth being in the form of radially disposed pins partially housed in holes formed around the periphery and said teeth being adapted to rotate independently, anti-friction bearings for each tooth positioned intermediate the tooth and its housing in the centre portion, and means for adjustably retaining the pin in its housing in the centre portion, said means comprising a tapered sleeve surrounding part of the inner portion of the pin, and a tapered pin engaging with the centre portion and said sleeve, as set forth.

In testimony whereof I have signed my name to this specification.

JAMES LAX.